United States Patent
Anderson

[15] 3,673,134
[45] June 27, 1972

[54] AGRICULTURAL MULCH

[72] Inventor: Bernard F. Anderson, West Chester, Pa.

[73] Assignee: E. I. du Pont de Nemours and Company, Wilmington, Del.

[22] Filed: Aug. 3, 1970

[21] Appl. No.: 60,724

[52] U.S. Cl. ................................. 260/5, 47/9, 47/DIG. 7, 117/138.8 E, 260/4 R, 260/28.5 A, 260/33.6 UA, 260/33.8 UA, 260/879 A
[51] Int. Cl. ................................. C08c 9/06, A01g 13/02
[58] Field of Search .................. 260/4 R, 5; 47/9, DIG. 7

[56] References Cited

UNITED STATES PATENTS

| | | | |
|---|---|---|---|
| 3,274,731 | 9/1966 | Vigneault et al. | 47/9 |
| 3,320,695 | 5/1967 | Moore | 47/9 |
| 3,454,510 | 7/1969 | Newland et al. | 47/9 |
| 3,412,058 | 11/1968 | Boyer | 260/4 R |
| 3,496,125 | 2/1970 | Boyer et al. | 260/4 R |

Primary Examiner—John C. Bleutge
Attorney—Vernon R. Rice

[57] ABSTRACT

A film plastic in nature for use as an agricultural mulch. The film is a blend of an ethylene polymer, a substantially amorphous ethylene/propylene copolymer, a natural rubber and a paraffin wax. The films are sufficiently tough and flexible to allow handling and laying out on a planted soil surface, yet they readily rupture under the pressure of a growing seedling to allow plant penetration. The films degrade during a growing season to the point that they can be readily disposed of by plowing and/or disking into the ground.

6 Claims, No Drawings

AGRICULTURAL MULCH

BACKGROUND OF THE INVENTION

Plastic films have been found to be very effective ground coverings for fields containing newly planted seeds. The films serve to protect the plants from extreme temperatures and drought and are useful in controlling weeds. Films have also been used to reduce surface crusting, thereby improving seed germination and seedling emergence. The color of the film can also be used to regulate the amount of light reaching the soil surface. When the film is black, no light passes through and when clear almost complete light transmission occurs.

In order that a film be effective as a ground covering it must have a balance of several important properties. The film must be sufficiently strong and flexible that it can be handled and laid out over large surface areas by use of a machine without rupture or tearing. The film must not, however, be so strong that it prevents plant breakthrough, i.e., penetration of the newly emerged seedling through the film. Finally, after the film has served its purpose at the end of the growing season, it must degrade to the point that it is easily disposed of merely by plowing into the soil. This avoids the laborious work of picking up the film or burning it.

While films have been suggested for use as mulches for crops, such as those described in U.S. Pat. Nos. 3,320.695 to Moore and 3,274,731 to Vigneault, none has been found which has an adequate balance of the important properties mentioned above.

SUMMARY OF THE INVENTION

This invention provides a film suitable for agricultural mulching which consists essentially of a blend of, in parts by weight per 100 parts of blend:

a. about 16–40 parts of an ethylene polymer,
b. about 10–50 parts of a substantially amorphous ethylene/propylene copolymer,
c. about 15–30 parts of natural rubber, and
d. about 20–26 parts of a paraffin wax.

DETAILED DESCRIPTION

The ethylene polymer used in this invention can be polyethylene or a copolymer of ethylene with up to about 5 percent by weight of a $C_3$–$C_{10}$ α-olefin such as propylene, 1-butene or 1-pentene. Either the high pressure, low density, branched polyethylene or the low pressure, high density, linear polyethylene can be used. Both materials and methods for their preparation are well known in the art. The polyethylenes used normally have densities of about 0.91 to 0.98 gram per cc. at 25° C. Branched polyethylene having a density not greater than 0.93 gram per cc. at 25° C. is preferred. The polyethylene is used in the amount of about 16–40 parts by weight per 100 parts of the blend. Detailed descriptions of methods for preparing both branched and linear polyethylene are given in R.A.V. Raff and K.W. Doak, "Crystalline Olefin Polymers," Part I, Interscience Publishers, New York, N.Y., 1965.

The term "ethylene/propylene copolymer" as used herein includes dipolymers of ethylene and propylene and terpolymers of ethylene, propylene and a nonconjugated diene such as 1,4-hexadiene. The ethylene/propylene copolymers contain about 30–70 weight percent ethylene, about 60–20 weight percent propylene and 0–10 weight percent nonconjugated diene. They are rubbery and substantially amorphous, i.e., they have less than 5 percent crystallinity as determined by differential thermal analysis.

The ethylene/propylene dipolymers are well known in the art. They can be prepared by copolymerization of the monomers in an inert diluent or solvent using coordination catalyst systems such as alkyl aluminums in combination with compounds of metals of sub-groups 4–6 of the periodic table, e.g., vanadium oxychloride and titanium tetrachloride.

The nonconjugated diene of the terpolymers used in this invention corresponds to the formula

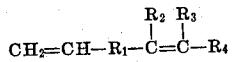

wherein $R_1$ is $C_1$–$C_8$ alkylene and $R_2$, $R_3$ and $R_4$ are independently hydrogen or an alkyl radical, with the proviso that the R groups in said formula are such that the diene has about six to 22 carbon atoms. Representative dienes are 1,4-hexadiene; 1,9-octadecadiene; 6-methyl-1,5-heptadiene; 7-methyl-1,6-octadiene; 11-ethyl-1,11-tridecadiene; 9-ethyl-1,9-undecadiene; 7-ethyl-1,7-nonadiene; 8-propyl-1,8-undecadiene; 8-ethyl-1,8-decadiene; 10-ethyl-1,9-dodecadiene; 12-ethyl-1,12-tetradecadiene; 13-n-butyl-1,12-heptadecadiene; and 15-ethyl-1,15-heptadecadiene. Open-chain dienes having two terminal non-conjugated carbon-to-carbon double bonds, where $R_2$, $R_3$ and $R_4$ are hydrogen, e.g., 1,5-hexadiene or 1,4-pentadiene, can be used but are much less preferred. Cyclic nonconjugated dienes include dicyclopentadiene; 5-alkenyl-substituted-2-norbornenes, e.g., 5-buteneyl-2-norbornene, 5-alkylidene-2-norbornenes (including ethylidene-2-norbornenes and 5-methylene-2-norbornene), 2-alkyl-2,5-norbornadienes, (e.g., 2-ethyl-2,5-norbornadiene) and 1,5-cyclooctadiene. The preferred diene is 1,4-hexadiene because of the outstanding physical properties of the copolymers prepared therefrom.

The ethylene/propylene/diene terpolymers can be prepared by copolymerization of the monomers in an inert solvent using a coordination catalyst system such as diisobutylaluminum chloride and vanadium oxychloride. Details of their preparation are given in U.S. Pat. Nos. 2,933,480; 3,000,866; 3,260,708 and in M. Sittig, "Stereo-Rubber and Other Elastomer Processes," Noyes Development Corp., Part Ridge, N. J., 1967.

The ethylene/propylene copolymers are used in the amount of about 10–50 parts by weight per 100 parts of blend.

Any kind of natural rubber, i.e., cis-polyisoprene, can be used in this invention. Representative grades of natural rubber include ribbed smoked sheets, thick pale crepes, thin pale crepes, estate crepes, and the like. Details on the kinds and quality of natural rubbers available can be found in Morton, "Introduction to Rubber Technology," Reinhold Publishing Corp., New York, N. Y. (1963). Natural rubber is used in the amount of about 15–30 parts per 100 parts of the blend. The preferred grade of natural rubber for use in this invention is ribbed smoked sheet.

The waxes used in the blends of this invention are commonly referred to as "paraffin wax," obtained by fractional distillation of crude petroleum. These benzene-soluble waxes are generally long-chain saturated hydrocarbons containing about 15–30 carbon atoms. The preferred waxes have a specific gravity of about 0.880–0.915 and a melting point of about 47°–65° C. The waxes are used in the amount of about 20–26 parts by weight per 100 parts of the blend.

Other additives can be used in combination with the four components described above to alter the properties of the blend. Pigments such as carbon black can be added to regulate the amount and kind of light passing through the film. The film can also contain a catalyst such as a pro-oxidant which promotes the degradation of the polymers upon exposure to the elements. The rate of degradation can be controlled to some extent by the amount and kind of catalyst used. Representative of such catalysts are the manganese and cobalt naphthenates and stearates.

In addition to the additives mentioned above, materials such as plasticizers, fillers, fertilizer components, insecticides, fungicides, and the like can be incorporated into the film.

The proportions of each of the four essential components of the blends of this invention vary with the use intended for the film. Polyethylene is the backbone of the film and gives it toughness and resistance to degradation. Thus, as the amount of polyethylene used increases, the greater will be the resistance of the film to plant breakthrough and degradation. The ethylene/propylene rubbery copolymer softens the film, gives it more elasticity and flexibility (thus rendering the film more easily handleable) and reduces its resistance to plant breakthrough. Increasing the amount of rubbery ethylene/propylene copolymer also extends the film degradation time. Natural rubber imparts elasticity and flexibility to the film and renders it more vulnerable to degradation. Paraffin wax makes the film more susceptible to plant breakthrough.

Given the above, one skilled in the art can adjust the proportions of the components making up a film composition to achieve the desired effects of seedling penetration and degradation of the film. For tender seedlings with low growing force, such as onions, melons and cabbage, the proportion of polyethylene is usually decreased and the ethylene/propylene copolymer, natural rubber and wax increased. For harder seedlings with high growing force, such as cotton, peas and asparagus, the polyethylene proportion should be increased and the ethylene/propylene copolymer, natural rubber and wax proportions decreased. The propensity of the film to degrade is varied according to the period desired to have the film intact on the ground. Normally, the shorter the growing season of the crop, the more degradable should be the film. The film is rendered more degradable by increasing the proportion of natural rubber and decreasing the ethylene/propylene copolymer and the polyethylene proportions.

In making the films, the components described above are blended into a homogeneous mass by routine mechanical means used in the rubber industry such as internal mixers. Banbury mixers are particularly effective. The resulting blend can then be fabricated into a film by extrusion through a slit die. The film is taken up on a roll as it leaves the die. If desired, the thickness of the film can be reduced by drawing on a cold roll. The film as used can vary in thickness from about 5–125 microns.

The films of this invention can be applied to the soil simply by unrolling a roll of film and laying it over the soil. The edges should be tucked into the soil to secure the film. It is particularly preferred, however, that an adhesive-modifier be applied to the film to obtain better adhesion to the soil and avoid the necessity of tucking the edges into the soil. Such adhesive-modifiers are prepared by mixing (a) about 3–7 percent by weight of a substantially amorphous ethylene/propylene/1,4-hexadiene copolymer (containing about 70–75 percent by weight ethylene and about 2–4 percent by weight 1,4-hexadiene), (b) about 52–68 percent by weight of a paraffin oil, and (c) about 25–47 percent by weight of trichloroethylene. "Paraffin oil" is a well-known commercial product which is a mixture of liquid hydrocarbons obtained from paraffin distillate, a distilled petroleum fraction. Liquid petrolatum, also a mixture of liquid hydrocarbons soluble in ether, benzene and chloroform and having a specific gravity of about 0.828–0.905 (25° C.), is also known as "paraffin oil" and can be used in preparing the adhesive modifier.

The use of such an adhesive-modifier, which can be applied to the film by a mechanical device just prior to laying the film, not only improves adhesion of the film to the soil but also renders the film more susceptible to plant penetration. If it is necessary only to make the film more susceptible to plant penetration, a modifier alone can be used. Such modifiers can be paraffin oil and naphthenic hydrocarbons. These materials, an adhesive modifier or modifier alone, permit the use of a film which is initially tough enough to be processed and handled but which after application of these materials, is subject to plant penetration by tender seedlings.

The films of this invention can be effectively used as ground mulches for a variety of crops having widely varying growing seasons. They are particularly valuable in that they readily permit young emerging plant breakthrough. Thus the films can be applied at an early stage after planting and holes do not have to be provided in the film to allow the plants to emerge. Moreover, after the growing season, the films do not have to be gathered up, raked or burned, as they degrade to a point that they can be conveniently plowed into the soil with regular tilling machinery.

The invention is further illustrated by the following examples wherein parts and percentages are by weight unless indicated otherwise.

EXAMPLE 1

A. The following materials are blended on a two roll mill.

| | Parts By Weight | |
|---|---|---|
| | A | B |
| Polyethylene (a high pressure low density polymer having a melt index of 100 and density of 0.922 gram per cc. at 20°C., "ALATHON" 3034) | 16 | 38.4 |
| Ethylene/propylene/1,4-hexadiene copolymer (53% ethylene, 42% propylene and 3.3% 1,4-hexadiene, Mooney viscosity $M_L^4$ at 250°F. = 20, crystallinity less than 3% by differential thermal analysis, "NORDEL") | 48 | 11.5 |
| Natural Rubber (0 1 Ribbed Smoked Sheet) | 16 | 26.9 |
| Paraffin Wax - 0 115 Refined, Atlantic Richfield | 20 | 23.2 |

With mill rolls at 49° C., the ethylene/propylene/1,4-hexadiene copolymer (EPDM), natural rubber, and paraffin wax are blended together. Roll temperature is raised to 138° C. and the polyethylene is added to the blend of EPDM-natural rubber-wax. One-and-a-half grams of the resulting blend are placed between a poly(ethylene terephthalate) "MYLAR" sheet and pressed for 2 minutes at 149° C. at 84 Kg/cm². When cool, the thin films (approximately 75µ thick) are removed from the "MYLAR" and used for growing tests. The films are fixed over 7.5 cm. diameter 250 cc. beakers which contain cotton seeds, water (20 cc.) and soil to fill the beaker to within 1.25 cm. of the top of the beaker. The seeds are planted 1 cm. deep in the soil. Cotton seedlings penetrate both films under room temperature laboratory conditions.

B. A 95 centimeter wide 25 micron gauge film (based on blend A above), made by flat die-extruder drawing, is laid over string bean beds located at the University of California, Riverside, Calif. Upon emerging from the earth, bean seedlings penetrated the film.

C. When 10 parts of manganese naphthenate are added to a 75µ thick film A, described above, and the film is exposed to a sun lamp for 18 hours, the film severely degrades as measured by manual elongation. The same film without the manganese naphthenate, when subjected to the same conditions, shows little sign of degradation.

D. In order to compare the degradability of compositions of this invention depending on the proportion of natural rubber present, samples A and B of part (A) were fabricated into 25 micron-thick films 18 inches wide by flat die extruder drawing. The samples were then exposed to California sun for varying periods. After 60 days, sample A had deteriorated slightly as indicated by manual measurement of its elongation at break and tear resistance. Sample B, after only 5 days, was substantially degraded as indicated by the same measurements.

EXAMPLE 2

To further compare degradability of compositions of this invention, samples 25 to 38µ thick prepared as described below are exposed to Pennsylvania sun for extended periods. Cotton seedlings penetrate all films. The composition of the samples and the degradability of each are compared below. The film ingredients are blended as described in part A of Example 1 and the films are formed by flat die extruder drawing.

Parts By Weight

"NORDEL" as described

| | | | | |
|---|---|---|---|---|
| in Example 1 | 48 | 31 | 27 | 23.2 |
| 0 1 Ribbed Smoked Sheet | 16 | 16 | 19 | 15.2 |
| "ALATHON" 3034 | 16 | 31 | 31 | 38.4 |
| Paraffin Wax as described in Example 1 | 20 | 22 | 23 | 23.2 |
| Approximate Days To Point Of Degradation For Easy "Disking In" Disposal | >6 mo. | 32 days | 25 days | 19 days |

EXAMPLE 3

The effect of an adhesive-modifier composition on the seedling penetration and plant degradation properties of films of this invention is illustrated as follows:

An adhesive-modifier is prepared by mixing 5 parts of a terpolymer of ethylene, propylene and 1,4-hexadiene (containing about 70–75 percent by weight ethylene and about 3 percent by weight diene) and 95 parts of solvent-refined neutral paraffin oil ("Citgo" 90103), and mixing 70 parts of this EPDM/oil mixture with 30 parts of trichloroethylene.

Two film samples are prepared by blending the following ingredients on a two roll mill as described in Part A of Example 1, and fabricating the blend into 29μ films by flat die extruder drawing.

| | Parts By Weight | |
|---|---|---|
| "NORDEL" as described in Example 1 | 30.8 | 23.2 |
| 0 1 Ribbed Smoked Sheet | 15.2 | 15.2 |
| "ALATHON" 3034 | 30.8 | 38.4 |
| Paraffin Wax as described in Example 1 | 23.2 | 23.2 |

Strips of film about 15 centimeters wide are applied over cabbage and pea beds at the University of California, Riverside, Calif. Prior to laying the film it is coated with the adhesive-modifier applied by a transfer roll laying device, and the coated film was pressured onto the soil by a sponge roller.

Plant seedlings penetrated both films. Both types of films had within 60 days degraded to the point of easy disposal by disking into the soil.

What is claimed is:

1. A film suitable for use as an agricultural mulch which consists essentially of a blend of, in parts by weight
   a. about 16–40 parts of polyethylene or a copolymer of ethylene with up to about 5 percent by weight of a $C_3$–$C_{10}$ α-olefin,
   b. about 10–50 parts of a substantially amorphous ethylene-propylene copolymer,
   c. about 15–30 parts of natural rubber, and
   d. about 20–26 parts of paraffin wax.

2. A composition of claim 1 wherein the ethylene polymer is branched polyethylene having a density not greater than 0.93 gram per cc. at 25° C.

3. A composition of claim 1 wherein the ethylene/propylene copolymer is a terpolymer of 30–70 weight percent ethylene, 60–20 weight percent propylene and 0–10 weight percent of a nonconjugated diene.

4. A composition of claim 3 wherein the nonconjugated diene is 1–10 weight percent of 1,4-hexadiene.

5. A composition of claim 1 wherein the natural rubber is smoked sheet grade.

6. A composition of claim 1 wherein the ethylene polymer is a branched polyethylene having a density not greater than 0.93 gram per cubic centimeter at 25° C., the substantially amorphous ethylene/propylene copolymer is a terpolymer of ethylene, propylene and 1,4-hexadiene and the natural rubber is smoked sheet grade.

* * * * *